US011026538B2

(12) United States Patent
Stasch et al.

(10) Patent No.: US 11,026,538 B2
(45) Date of Patent: Jun. 8, 2021

(54) DRINKS PREPARATION MACHINE, A SYSTEM WITH A DRINKS PREPARATION MACHINE, METHOD FOR ITS ACTIVATION

(71) Applicant: Qbo Coffee GmbH, Wallisellen (CH)

(72) Inventors: Rafael Stasch, Arnsberg (DE); Rüdiger Ternitè, Hamburg (DE); Robert Stein, Bad Bramstedt (DE); Doreen Hartmann, Görlitz (DE)

(73) Assignee: QBO COFFEE GMBH, Wallisellen (CH)

( * ) Notice: Subject to any disclaimer, the term of this patent is extended or adjusted under 35 U.S.C. 154(b) by 169 days.

(21) Appl. No.: 15/775,914

(22) PCT Filed: Nov. 14, 2016

(86) PCT No.: PCT/EP2016/077593
§ 371 (c)(1),
(2) Date: May 14, 2018

(87) PCT Pub. No.: WO2017/085020
PCT Pub. Date: May 26, 2017

(65) Prior Publication Data
US 2018/0325307 A1   Nov. 15, 2018

(30) Foreign Application Priority Data
Nov. 16, 2015 (EP) .................................... 15194667

(51) Int. Cl.
*A47J 31/40* (2006.01)
*A47J 31/44* (2006.01)
*A47J 31/52* (2006.01)

(52) U.S. Cl.
CPC ......... *A47J 31/407* (2013.01); *A47J 31/4485* (2013.01); *A47J 31/4492* (2013.01);
(Continued)

(58) Field of Classification Search
CPC ................................................ A47J 31/40–41
See application file for complete search history.

(56) References Cited

U.S. PATENT DOCUMENTS

| | | | |
|---|---|---|---|
| 6,759,072 B1 * | 7/2004 | Gutwein | G06Q 20/342 426/433 |
| 7,350,455 B2 * | 4/2008 | Vetterli | A47J 31/42 99/280 |

(Continued)

FOREIGN PATENT DOCUMENTS

| | | |
|---|---|---|
| CN | 102089236 | 6/2011 |
| CN | 103315631 | 9/2013 |

(Continued)

OTHER PUBLICATIONS

Chinese Office Action dated Nov. 22, 2019, Application No. 201680066614.7, English translation included, 18 pages.
(Continued)

*Primary Examiner* — Jason L Vaughan
(74) *Attorney, Agent, or Firm* — Rankin, Hill & Clark LLP

(57) ABSTRACT

A method for operating a drinks preparation machine, for producing a total product amid the use of a portion package, and according to a preparation prescript. The method includes detecting a portion code of a portion package by way of a portion recognition unit; determining first preparation parameters of the preparation prescript that are assigned to the portion code and are stored in the drinks preparation machine, and determining second preparation parameters of the preparation prescript, wherein at least one of the first and/or the second preparation parameters is an adaptable preparation parameter, and at least one preparation parameters is not adaptable; detecting a user input for adapting at least one adaptable preparation parameter; and
(Continued)

preparing the total product according to the preparation prescript with at least one adapted preparation parameter.

11 Claims, 3 Drawing Sheets

(52) U.S. Cl.
CPC .............. *A47J 31/52* (2013.01); *A47J 31/521* (2018.08); *A47J 31/5253* (2018.08); *A47J 31/5255* (2018.08)

(56) References Cited

U.S. PATENT DOCUMENTS

| | | | | |
|---|---|---|---|---|
| 7,607,385 B2* | 10/2009 | Halliday | ................. | A47J 31/56 99/280 |
| 7,713,482 B2* | 5/2010 | Rinker | ..................... | A23L 2/52 210/203 |
| 7,762,181 B2* | 7/2010 | Boland | ................... | A47J 31/52 99/322 |
| 8,032,251 B2* | 10/2011 | Monn | ....................... | G07F 9/02 700/233 |
| 8,251,258 B2* | 8/2012 | Rudick | ............... | B67D 1/0034 222/1 |
| 8,322,570 B2* | 12/2012 | Beavis | ................... | A47J 31/42 222/52 |
| 8,325,045 B2* | 12/2012 | Dattolo | ............... | H01Q 1/2216 340/572.7 |
| 8,364,321 B2* | 1/2013 | Kollep | ................. | A47J 31/407 700/283 |
| 8,512,784 B2* | 8/2013 | Denisart | ................ | A47J 31/22 426/433 |
| 8,515,574 B2* | 8/2013 | Studor | ..................... | A23F 5/26 700/231 |
| 8,833,237 B2* | 9/2014 | Gussmann | .............. | A47J 31/42 99/280 |
| 9,545,171 B2* | 1/2017 | Ye | ..................... | B65D 85/8043 |
| 9,980,596 B2* | 5/2018 | Rognon | ............... | A47J 31/4492 |
| 10,042,525 B2* | 8/2018 | De'Longhi | .............. | A47J 31/52 |
| 10,226,148 B2* | 3/2019 | Roth | .................... | B67D 1/0041 |
| 10,485,375 B2* | 11/2019 | Wessels | ............... | G07F 17/0078 |
| 10,586,417 B2* | 3/2020 | Illy | .......................... | A47J 31/56 |
| 2011/0036452 A1* | 2/2011 | Schnyder | ............ | B67D 1/0871 141/83 |
| 2012/0037008 A1* | 2/2012 | Rodriguez | ............ | A47J 31/525 99/289 R |
| 2012/0285986 A1* | 11/2012 | Irvin | ..................... | A47J 31/007 222/1 |
| 2015/0201796 A1 | 7/2015 | Kuempel et al. | | |
| 2015/0351581 A1* | 12/2015 | Li | ........................ | A47J 31/4403 426/231 |
| 2017/0332827 A1* | 11/2017 | Aschwanden | ........ | A47J 31/407 |

FOREIGN PATENT DOCUMENTS

| | | |
|---|---|---|
| EP | 1 440 640 | 7/2004 |
| EP | 2 345 352 | 7/2011 |
| EP | 2 572 609 | 3/2013 |
| EP | 3 031 748 | 6/2016 |
| EP | 3 031 749 | 6/2016 |
| JP | 2013-533003 | 8/2013 |
| JP | 2015-521057 | 7/2015 |
| JP | 2015-525589 | 9/2015 |
| JP | 2015-526164 | 9/2015 |
| JP | 2015-171534 | 10/2015 |
| WO | 2014/090965 | 6/2014 |
| WO | 2015/062272 | 5/2015 |
| WO | 2015/148089 | 10/2015 |

OTHER PUBLICATIONS

English translation of International Preliminary Report on Patentability dated May 22, 2018 (dated May 22, 2018), Application No. PCT/EP2016/077593, 6 pages.

* cited by examiner

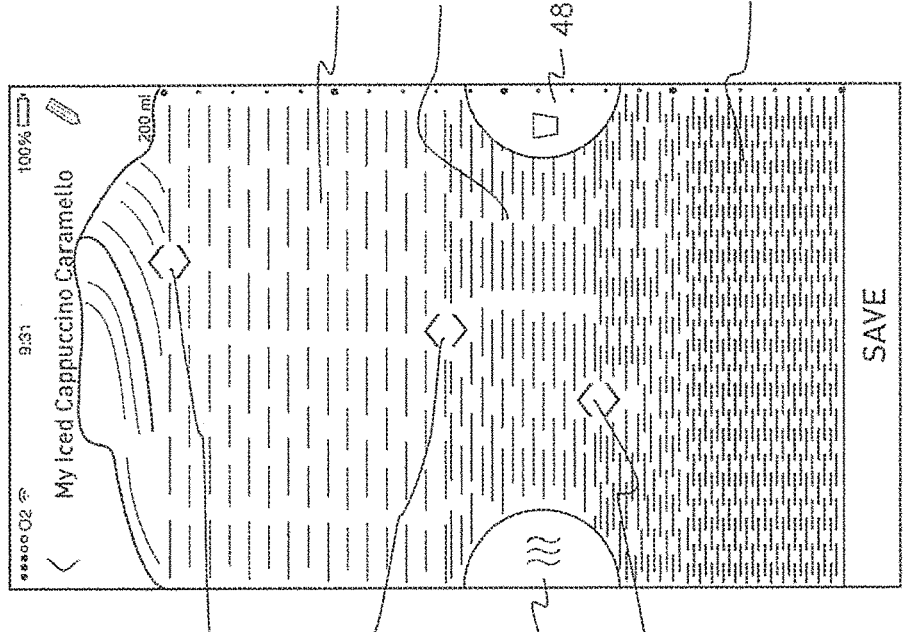

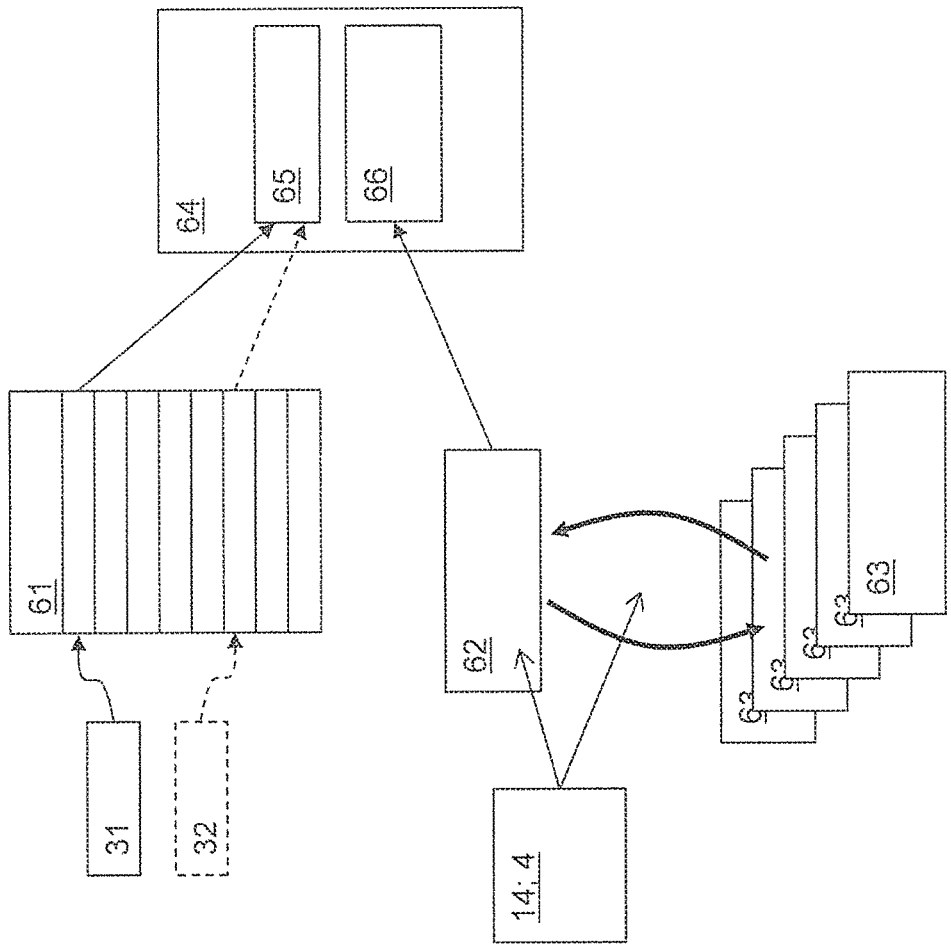

DRINKS PREPARATION MACHINE, A SYSTEM WITH A DRINKS PREPARATION MACHINE, METHOD FOR ITS ACTIVATION

BACKGROUND OF THE INVENTION

Field of the Invention

The invention relates to the field of drinks preparation machines for preparing drinks or the like from a portion package with a portion packaging and with an extraction material that is contained in the portion packaging.

Description of the Related Art

Drinks preparation machines for preparing drinks or the like from an extraction material which is present in a portion package are known for example as coffee machines or espresso machines. In many corresponding systems, the portion packaging is designed as capsules, in which the extraction material is sealed, for example in an airtight manner. For extraction, the capsule is pierced, for example at two sides that are opposite to one another. An extraction fluid—generally hot water—is then introduced at the first side. The extraction product is discharged from the capsule at the second side. This takes place in a so-called brewing module.

Apart from a brewing module, one or more further units for delivering and adding a further drinks component such as, for example, milk and/or milk froth can be present. The drinks preparation machine can therefore create a drink or generally speaking a total product from two or more part-products.

Corresponding preparation methods include a multitude of parameters depending on the type of drink.

WO 2015/062272 A1 shows a coffee machine that receives preparation parameters via a computer network. The identification of a coffee product is effected with a camera and with a barcode reader on the basis of a packaging of the product, possibly with assistance by the user. Preparation parameters are loaded from a server on the basis of the identification. They can be adapted and the adaptations stored.

EP 1 440 640 A2 shows a low-pressure drinks preparation machine, also for coffee. The emphasis lies on the mechanical design and the operating manner. Amongst other things, a code of a portion capsule can be read. The code defines preparation manners in a direct manner, thus not a capsule type. By way of this, one avoids capsule types and assigned parameters having to be stored and supplemented in the machine. On sequentially using two capsules, information on the first can be used to adapt the preparation with the second. An adaption of preparation parameters by a user cannot be recognised.

EP 2 345 352 A1 shows a coffee capsule with a 2D barcode. This code includes product information including preparation parameters, or a web address. However, no stored preparation parameters corresponding to the code are retrieved, but preparation parameters are represented directly as part of the code.

EP 2 572 609 A1 shows a tea machine, in which stored preparation parameters can be read out on the basis of a machine-readable code of a capsule. These parameters can be modified with stored fine tuning parameters, which are also read out in accordance with the code. A modification of the preparation parameters by a user is not envisaged.

US 2015/201796 A1 shows a code on a coffee package, said code itself including recipes with preparation parameters or defining the access to locally or remotely stored recipes. Recipes can be created and modified by the user, but how this is effected, however, is not described in detail. Recipes can be automatically adapted in accordance with the air pressure, temperature, water quality, age of the coffee etc. According to an embodiment, a user is instructed on operation and can manually input a drinks quantity. A roaster can define recipes and distribute them to coffee machines.

SUMMARY OF THE INVENTION

A possible object of the invention is to provide a drinks preparation machine, a drinks preparation machine in combination with a portion package, a system with a drinks preparation machine, and a method for operating a drinks preparation machine, which permit an improved determining of parameters of a preparation method.

A further possible object is to provide such a drinks preparation machine, such a drinks preparation machine in combination with a portion package, such a system and method, which permit the manufacture of a variety of drinks variants, wherein the preparation parameters are adapted as well as possible to the characteristics of a drinks variant and in particular to its starting materials.

According to a first aspect of the invention, of which several variants are described hereinafter, the method serves for the operation of a drinks preparation machine, for producing a total product amid the use of a portion package, and according to a preparation prescript, and includes the following steps:

detecting a portion code of a portion package by way of a portion recognition unit, typically when the portion package is inserted into the drinks preparation machine;
  determining first preparation parameters of the preparation prescript, which are assigned to the portion code and are stored in the drinks preparation machine, and determining second preparation parameters of the preparation prescript, wherein at least one of the first and/or the second preparation parameters is an adaptable preparation parameter, and in particular at least one of the first preparation parameters is not adaptable;
  detecting (acquiring) a user input for adapting at least one adaptable preparation parameter;
  preparing the total product according to the preparation prescript with at least one adapted preparation parameter.

These steps do not necessarily need to be carried out in the above sequence. For example, the detecting of a user input can be effected before the detecting of a portion code. Either way, the method permits the specification (setting) of product-specific preparation parameters that are defined by the type of portion package, and nevertheless permits the individual specifications of a user to be taken into account on drinks preparation.

According to a preferred embodiment of the invention, the at least one non-adaptable preparation parameter is a preparation parameter which is assigned to the portion code and is stored in the drinks preparation machine. Herein, it can be for example preparation parameters that have been optimised for the respective contents of the portion package by the manufacturer of the portion packages.

According to a variant of the method, a selection of one or more such preparation parameters is displayed to the user on an interface unit for detecting the user input for adapting the at least one adaptable preparation parameter, and an input of the user for adapting the preparation parameter is detected. A value for the adaptable preparation parameter can be specified by the first preparation parameters that are stored in the drinks preparation machine and are assigned to the portion code, but this does not necessarily need to be the case. Herewith, it is possible to display a current or pre-defined value of the user parameter to the user, so that he can decide whether he wishes to change the value. The display can be produced in accordance with the number and with the type of adapted preparation parameters by way of a flexibly programmable interface unit, for example with a screen and in particular a touchscreen.

Herein, the interface unit can be an operating unit of the drinks preparation machine or a user interface of an operating appliance, the appliance being connected to the drinks preparation machine via a communication connection. Depending on the embodiment therefore, the adaptation is effected at the drinks preparation machine itself or at an operating appliance that is remote, i.e. physically separated, from the drinks preparation machine but which communicates with the drinks preparation machine.

According to a variant of the method, one or more preparation parameters that are adapted by the user (which therefore form a set of adapted preparation parameters) are storable in the drinks preparation machine as a recipe. They can be retrieved again at a later point in time for detecting the user input for adapting the at least one adaptable preparation parameter. Concerning this retrieval, it is therefore no longer necessarily for the at least one adaptable preparation parameter (thus possibly also a complete set of such) to be manually adapted by the user, but the stored recipe is retrieved and the at least one adaptable preparation parameter which is specified by the recipe is provided for the next preparation. Subsequently, one can still yet envisage the possibility of one or more or thus retrieved preparation parameters being able to be modified by the user.

According to a variant of the method, the at least one adaptable preparation parameter defines a quantity of the total product or a quantity of one of several part-products, from which the total product is composed.

It is possible for preparation parameters, for example such, which have an effect on the quantity of the products, not to be adaptable. Such non-adaptable preparation parameters are for example the pressure and temperature for the operation of a brewing unit or—depending on the total product—a temporal sequence of the preparation of part-products.

Generally, non-adaptable preparation parameters permit the prevention of a compromising of the quality of the products. Concerning certain preparation parameters, there is no or very little leeway, and furthermore, without any special knowledge, it is very difficult for a user to understand what influence a change of a pre-brewing time, of the water temperature or of the pressure in the coffee machine has upon the result and how this has an effect upon the end result depending on the coffee variety, roasting and grinding degree. If one gives the user the possibility of freely adjusting/setting all preparation parameters, then he is often overwhelmed and at the end is not happy with the drink, without being able to understand which setting or adjustment led to the result not meeting his expectations. Certain preparation parameters can be individually pre-assigned for each capsule variety, in order to prevent this, and such preparation parameters are not adaptable.

According to a variant of the method, the drinks preparation machine is a coffee machine, which is designed for preparing a total product with a first share of coffee as a first part-product and with a second share of milk as a second part-product. Herein, a first adaptable preparation parameter defines a first quantity share of the first share and a second adaptable preparation parameter a second quantity share of the second share.

The total product can also include a third share of milk froth as the third part-product, with a third adaptable preparation parameter that defines a third quantity share of the third share. In this case, the drinks preparation machine includes one or more supplementary units which are designed for delivering milk and producing milk froth.

According to a variant of the method, further adaptable preparation parameters define at least one of:
 a milk temperature;
 a receptacle size or a total volume of the total product;
 a quantity of milk froth;
 a quantity ratio of milk and milk froth;
 a temporal sequence, in which the part-products are to be created. As already mentioned, this sequence under certain circumstances can however also be a non-adaptable preparation parameter. Alternatively, the sequence can also be automatically determined in dependence on other adaptable preparation parameters.

It is herewith possible to simply define a multitude of coffee preparation variants and allow them to be prepared.

According to a second aspect of the invention that can be realised combined with the first aspect in all its variants, but which can also be realised without the step of detecting the user input for adapting the at least one adaptable preparation parameter, the portion code defines a portion identity and an assignment of portion identities to first preparation parameters and/or additional information is stored in the drinks preparation machine, and the following steps are carried out:
 determining assigned first preparation parameters and/or additional information, on the basis of the portion identity of a portion package;
 if no assigned first preparation parameters and/or additional information are present, representing a display to the user with a request to carry out or to permit a downloading of updated first preparation parameters and/or additional information.

Herewith, it is possible on the one hand to display identity-specific (or variety-specific) information on a portion package, and in the case, that such information—for example after introducing new varieties—is not stored in the drinks preparation machine, obtaining this information.

According to a variant of the method according to the first or the second aspect, the portion code defines a portion category and a portion identity, and an assignment of portion categories and portion identities to first preparation parameters is stored in the drinks preparation machine. Herein, in the step of determining stored first preparation parameters of the preparation prescript which are assigned to the portion code, the following steps are carried out:
 determining assigned first preparation parameters on the basis of the portion identity of a portion package;
 if no assigned first preparation parameters are stored, determining first preparation parameters which are assigned to the portion category;
and the thus determined first preparation parameters are used in the further steps.

Herewith, should no identity-specific first operation parameters for an (inserted) portion package be present, it is possible to use category-specific first preparation parameters which perhaps do not provide a result which is optimal, but one which is still good.

In the case that a portion category and a portion identity are present, the portion identity can be coded in a manner depending on or independently of the portion category. In the case of the independent coding, the portion category is defined or coded by an information unit (typically a number of bits) which is separate from the portion identity. In the case of the dependent coding, the portion identity is defined by the combination of a respective information unit with the portion category, i.e. the information unit—e.g. a bit sequence—in which the portion category is coded is a constituent of the information unit, in which the portion identity is defined. Consequently, for the dependent coding, the portion category can be unambiguously determined on the basis of the portion identity.

According to a variant of the method according to the first or the second aspect, the portion code defines a portion category, and an assignment of portion categories to first preparation parameters is stored in the drinks preparation machine. Herein, the following step is carried out in the step of determining stored first preparation parameters of the preparation prescript which are assigned to the portion code:

determining assigned, first preparation parameters of the preparation prescript on the basis of the portion category of a portion package;

and the thus determined first preparation parameters are used in the further steps. Herein, a portion identity of the portion package can be used, in order to determine and display the assigned additional information.

By way of this, it is a possible to always use the same limited set of first preparation parameters corresponding to a smaller number of portion categories, even given a multitude of different portion identities.

According to a variant of the method according to the first or to the second aspect, the portion code defines a portion category and a portion identity, and at least one of the portion categories is characterised as a special category and an assignment of portion identities to first preparation parameters is stored, in the drinks preparation machine.

Herein, the following steps are carried out in the step of determining stored first preparation parameters of the preparation prescript which are assigned to the portion code:

determining, on the basis of the portion category of a portion package, whether this belongs to the special category:

if this is the case, determining assigned, first preparation parameters on the basis of the portion identity of the portion package;

and the thus determined first preparation parameters are used in the further steps.

This variant can be realised in combination with one of the two above-mentioned variants. Thus for example according to this variant, for individual portion categories from the special category, the first preparation parameters can be determined in accordance with the portion identity, whereas for other portion categories, the first preparation parameters are determined in accordance with the portion category.

In further embodiments, a mixed form is present, according to which for a first group of portion categories the assigned, first preparation parameters are only dependent on the respective portion category, and for a second group of portion categories the assigned first preparation parameters are also dependent on the respective portion identity. For example, one can thus always use the same set of first preparation parameters (brewing profile) for a category of different coffees, but also different first preparation parameters for different identities within a category "special capsules". Such identities are, for example, "cleaning capsule", "descaling capsule", "service capsule", . . . etc. and in particular correspond to capsules that do not serve for the preparation of a product envisaged for consumption.

According to a variant of the method, the preparation is not carried out and optionally a notice is displayed, if a portion identity and a portion category are inconsistent with one another, in particular if the portion category indicates a special category of the portion that is not suitable for consumption (for example a special capsule) and the portion identity does not match this category.

The drinks preparation machine is designed for producing a total product amid the use of a portion package and for carrying out the method which is described above.

The drinks preparation machine in combination with a portion package is designed for producing a total product amid the use of a portion package and for carrying out the method which is described above.

The system includes at least one drinks preparation machine and a portion package and serves for producing a total product amid the use of a portion package. Herein, the system is designed for carrying out the method which is described above.

In an embodiment, the system includes an operating appliance that is separate (thus physically separated) from the drinks preparation machine and designed for detecting the user input for adapting the at least one adaptable preparation parameter. The operating apparatus, for example, is a mobile telephone or smartphone or a smart watch or a different type of portable computer or an appliance at least with input elements and communication means.

A computer program can be loaded into an internal memory of a digital data processing unit of the drinks preparation machine and includes computer program code means, which when they are implemented in the digital data processing unit of the drinks preparation machine, bring this to carry out the steps, envisaged for the drinks preparation machine, of the method that is described above. A computer product includes a data carrier, or a computer-readable medium, on which the computer program code means are stored.

BRIEF DESCRIPTION OF THE DRAWINGS

The subject-matter is hereinafter explained in more detail by way of preferred embodiment examples which are represented in the accompanying drawings. In each case are shown schematically in:

FIG. 2-4 exemplary displays on an interface unit for preparing a product; and FIG. 5 data which is used on determining preparation parameters.

DETAILED DESCRIPTION OF THE INVENTION

Figure 1:
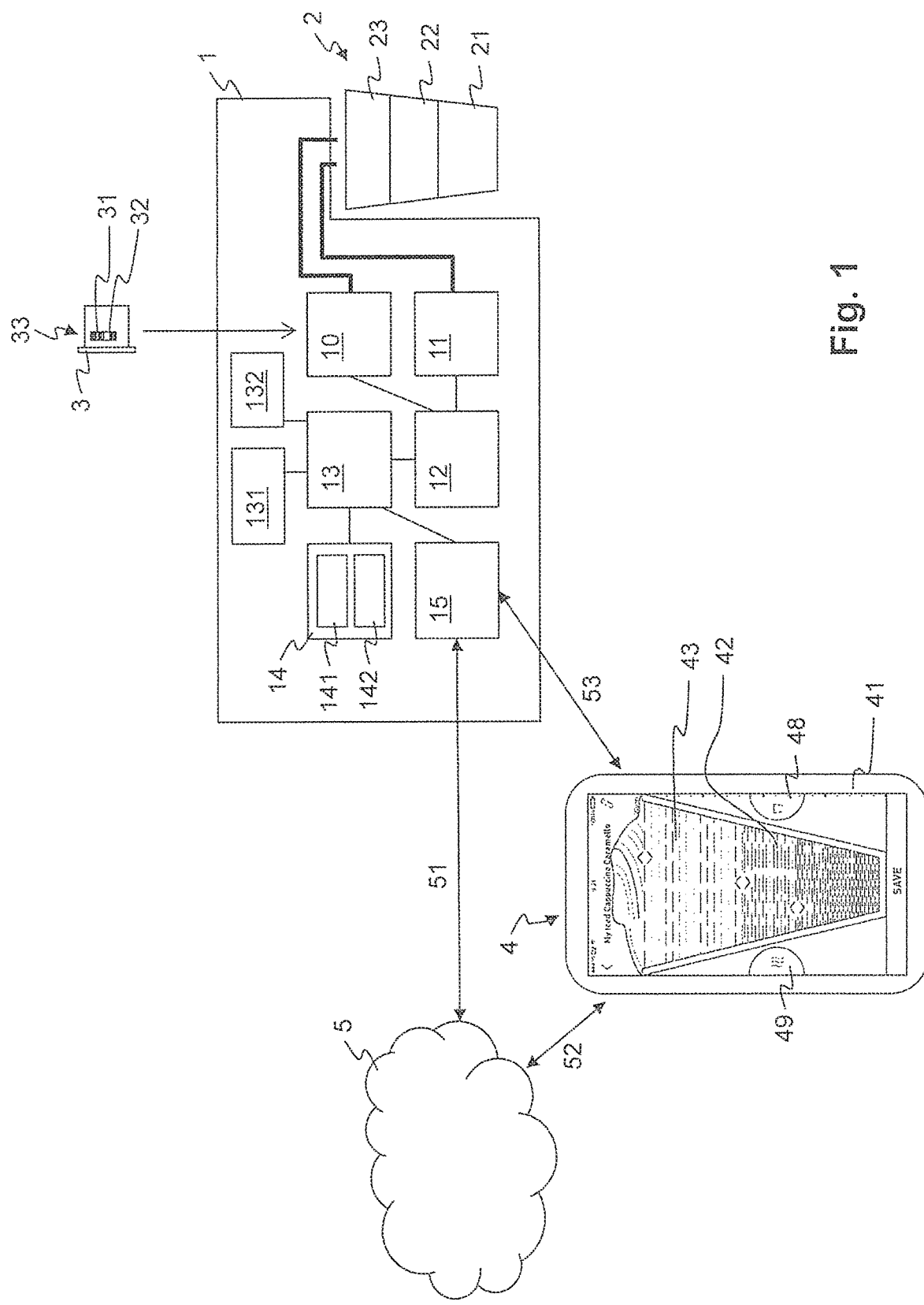
FIG. 1 a system for drinks preparation.

Basically, the same parts are provided with the same reference numerals in the figures.

FIG. 1 shows a system for drinks preparation with a drinks preparation machine 1 for filling a receptacle 2 with at least one extraction material from a portion package 3. The drinks preparation machine 1 can be connected to a communication network 5 such as an intranet or the internet via a first communication connection 51. An operating appliance 4, which can be mobile and portable, for example a mobile telephone or smartphone, or a dedicated appliance which is provided only for the operation of the drinks preparation machine 1 can communicate with the drinks preparation machine 1 in an indirect manner via a second communication connection 52 and the computer communication network 5 or directly via a third communication connection 53.

The drinks preparation machine 1 includes a basic unit 10 for extracting an extraction product by way of an extraction fluid. The drinks preparation machine 1 for example is a portion capsule coffee machine of the type known per se, wherein the basic unit 10 is a brewing module and the extraction fluid is hot water which is under pressure. The extraction product is fed to the receptacle 2.

The portion package 3 includes a portion packaging (for example, capsule) and an extraction material (for example, coffee), which is contained in the portion packaging.

The portion package 3 is provided with a machine-readable portion code 33. This can be realised by information carriers that are readable, for example, in an optical, mechanical or, via radio, wireless manner, or by a combination of two or more such information carriers. The portion code 33 represents a portion category 31, which specifies a category, to which the portion package 3 is assigned. Such categories can be different categories of drinks or products, such as "Espresso", "normal coffee", "filter coffee", "tea" and also "special capsule". The portion code 33 moreover represents a portion identity 32, to which the portion package 3 is assigned. Such identities can represent certain individual products or varieties, such as "Arabica No. 42" or "Colombia special". Portion packages 3 with the same portion category 31 can have different portion identities 32. Portion packages 3 or corresponding products of a different identity can therefore be grouped into categories by way of the portion category 31. The use of categories permits the preparation of products whose identity is still not yet known at the point of time of delivery of the drinks preparation machine (and without a software update). As is yet described in more detail further below, for this, the preparation—in every case or only given an unknown identity—can be carried out according to the category of a product.

The portion code 33 can be coded by way of a representation that is redundantly coded several times, generally as an optical code, for example as a tenfold redundant optical code, for example a one-dimensional or two-dimensional barcode or a code as described in the European patent applications EP 14 197 487.3 of Nov. 12, 2014 and EP 14 197 488.1 of Nov. 12, 2014. In an embodiment, the portion code 33 includes sixteen bits, of which six serve as test bits, four or five for coding the portion category 31 and six or five for coding the portion identity 32.

Herein, the portion identity can either be coded depending on the portion category or also independently. In the case of the independent coding, the portion identity is defined by a subset of the portion code, for example (according to the example begun above) six or five bits and therefore 64 and 32 portion identities respectively can be represented. The disadvantage herein is the fact that not every combination of portion identities and portion categories makes sense and therefore many portion codes which per se are conceivable are not used. In the case of the dependent coding, the portion identity is coded by the entirety of the portion code, thus by combination of the bits which are only assigned to the portion identity with the bits which code the portion category. 1024 different portion identities can be represented herewith in the present example.

These portion identities are assigned to a number (according to the example 16 or 32) of portion categories, wherein conversely several portion identities are assigned to each portion category. For reasons of safety, precisely one portion identity can be assigned to a certain portion category (for example special capsules, thus not suitable for consumption) as being allowable. All other bit combinations, which although code this certain portion category but not this precisely one portion identity, lead to no preparation being carried out and activate a warning display.

The drinks preparation machine 1 includes a supplementary unit 11 that can deliver or produce at least one further product or part-product, for example milk or milk froth which is likewise fed to the receptacle 2. The supplementary unit 11 can include heating elements and/or cooling elements for heating or cooling the at least one further product.

The extraction product and the at least one part-product are fed to the receptacle 2 in a simultaneous or sequential manner and in the receptacle 2 together form a total product, for example a "Caffe Macchiato" consisting of coffee, cold or warm milk, and milk froth. A total product is represented schematically as consisting of a first share 21, of a second share 22 and of a third share 23. In the receptacle 2, the shares can be layered above one another or mixed, depending on the preparation prescript. A "share" is to be understood as a volume share or a quantity share.

The drinks preparation machine 1 includes a control unit 12, a superordinate control unit 13, an operating unit 14 and a communication unit 15, for the operation by the user and for the optional communication with other appliances, for the control of the basic unit 10 and of the supplementary unit 11.

The control unit 12 is configured to activate the basic unit 10 and the supplementary unit 11, for example by way of it activating the pumps, valves, heating elements etc. of these units and detecting and processing measured values of temperatures, pressures, flow rate etc. The function of the control unit 12 can be realised by a single physical electronic unit, for example a microcontroller, or by several physical units or microcontrollers, which are each assigned to the basic unit 10 and the supplementary unit 11 and communicate with one another via a communication bus or transmit individual analog or binary signals via signal leads.

The super-ordinate control unit 13 is configured to activate the operating unit 14 and the communication unit 15. The superordinate control unit 13 can be realised separately from the control unit 12, physically and/or with regard to the programming technology, or however, together with the control unit 12 can form a single unit. In this context, the control unit 12 and the superordinate control unit 13 can be identical according to embodiments.

The superordinate control unit 13 is configured to receive the machine-readable portion code 33 of a portion package 3 from a capsule recognition unit 132. The capsule recognition 132 includes an optical, mechanical and/or wireless or radio-based read device for reading the portion code 33, in particular when the portion package is inserted into the drinks preparation machine 1.

The operating unit 14 includes an input unit 141, for example with switches, keys, rotary buttons, rotary/push buttons etc. and/or a touch-sensitive surface, as well as an output unit 142 with optical display means, such as lights or with a screen etc. and/or with acoustic display means such a loudspeaker, summer, etc.

The communication unit 15 is configured for communication via the first communication connection 51, which can be wireless (for example by way of Wi-Fi or WLAN, Bluetooth, etc.) or wire-connected (for example by way of Ethernet, USB), in particular for communication with the communication network 5. Furthermore, the communication unit 15 can communicate with the operating appliance 4 in a wireless manner (for example, by way of Wi-Fi or WLAN, Bluetooth, NFC etc.) or in a manner connected by wire (for example, by way of USB). The communication unit 15 can also be configured for reading out and writing a removable portable data carrier, for example via a USB interface or SD card interface.

The operating appliance 4, typically a mobile telephone or smartphone, includes a user interface 44, for example a touch-sensitive screen or touchscreen, which functions as an input unit and output unit. Additionally or alternatively, buttons and/or hardware and software for voice input of the operating appliance 4 can serve as input units. The operating appliance 4 can communicate with the communication network 5 via the second communication connection 52, typically via Wi-Fi or a WLAN or via a data communication that is based on radio communication (such as GPRS, UMTS, LTE). The operating appliance 4 can therefore also serve as a temporary Wi-Fi hotspot for connecting the drinks preparation machine 1 to the communication network 5.

Where it is not mentioned otherwise, information can be issued to the user and inputs of the user can be inputted, via the operating unit 14 and/or the operating appliance 4. Thus, whenever interactions with the user are described in the present invention, it is to be understood that what is meant by this are outputs and/or inputs by way of the operating unit 14 and/or by way of the operating appliance 4. Generalised, these can therefore be described as the interface unit.

The superordinate control unit 13 includes a memory 131, in which, amongst other things, preparation prescripts are stored. A preparation prescript includes at least control information which can be converted into commands for the control of the basic unit 10 and the supplementary unit 11. Such control information on the one hand includes sequence information, which specifies a sequence of steps that are to be carried out by the basic unit 10 and/or the supplementary unit 11 for producing a total product. On the other hand, the control information includes for example temperatures, volume details, time details, etc.—hereinafter generally also called preparation parameters—which parameterise a sequence.

Sequence information for example represents "switch on the heating of the supplementary unit; switching on the pump of the brewing module for fifteen seconds; wait for at least five seconds after switching off the pump until the heating to the desired temperature; switch on the milk pump for twelve seconds". The times and temperatures which are mentioned in this example can be specified by preparation parameters and/or be determined by the control in accordance with other preparation parameters and measured values of sensors.

Examples of preparation parameters for the basic unit 10 for the coffee preparation are the following. Herein, one assumes an optional two-stage brewing procedure with pre-brewing and brewing. Also only a subset of these parameters can be present. A set of such parameters can be called a "brewing profile".

Preheat temperature of the boiler: temperature which must be achieved before the pre-brewing E.g. 80° C. for coffee, 90° C. for espresso.
Delay time between preheating and start of the pump. E.g. also zero.
Pre-brewing quantity: water quantity until a brewing phase. E.g. 20 ml.
Brewing pause: Time between pre-brewing and brewing. E.g. zero or 5 sec.
Brewing temperature. E.g. 82° C. for coffee, 85° C. for espresso.
Brewing quantity: water quantity for the drink minus pre-brewing quantity. E.g. 110 ml for coffee, 25 ml for espresso.
Cooling water quantity: water quantity at the end of the brewing with a switched-off heater. E.g. 10 ml.
Waiting time unit the opening of a pressure-relief valve to an outlet. E.g. 3 sec.
Opening time of a pressure-relief valve. E.g. 5 sec.
Flow rate in each case for pre-brewing, brewing and cooling, in the case that a flow-regulation of the pump is present.
On/off of an anti-blocking function.
On/off of a post-rinsing Such a brewing profile can also be provided for preparing tea or another drink or for using a special capsule and include parameters corresponding to this.

The mentioned anti-blocking function, when it is active, reacts when the flow rate drops below a certain threshold. The pump pressure is then automatically temporarily reduced. The reason for this is because a blockage of the extraction spikes is suspected given a reduction of the flow rate. The temporary reduction of the pump pressure is to overcome the blockage. This is in contrast to the pump pressure only being simply increased only given a reduced, in order to again arrive at a desired flow rate. A detailed description concerning this is to be found in the patent application EP 14169279.8 of 21st of May, 2014.

A preparation prescript can also include user instructions. These instructions are part of the preparation of the total product and must be carried out by a user. For this, the user instructions can be displayed by way of the output unit 142 or the user interface 44 of the operating appliance 4. For example, such user instructions are "now add ice cubes" or "please measure 20 ml caramel syrup" or "now add the prepared caramel syrup" or "please stir" etc.

For preparing a product, control information or corresponding commands are implemented by the basic unit 10 and the supplementary unit 11 in accordance with the preparation prescript and a preparation sequence is realised by this. If the preparation prescript includes user instructions, then these are displayed to the user at corresponding locations of the sequence. After an acknowledgement by the user by way of the input unit 141 or the user interface 44, said acknowledgement confirming the execution of the user instruction to the system, the subsequent control information of the preparation sequence is implemented.

The conversion of the control information and the preparation parameters which are contained therein into apparatus-specific control values for the control, such as pump speed, pump times, valve opening times, heating power etc. is effected by the control unit 12 or by way of the superordinate control unit 13 and/or in local control units of the basic unit 10 or of the supplementary unit 11. Herein, functions or tables can be implemented for determining the apparatus-specific control values from the control information.

A preparation prescript can include preparation parameters, which may be adapted by the user, as well as preparation parameters which are not adaptable by the user and/or preparation parameters which change in dependence on the values, selected by the user, for other preparation parameters, but which cannot be changed in a direct manner. Adaptable preparation parameters for example are (volume) shares of part-products in the total product, a total quantity or the temperature of a part-product. Moreover, a sequence of the preparation of part-products can also be specifiable, or certain part-products can be simultaneously prepared and fed to the receptacle 2. The sequence can also be automatically set in dependence on other parameters. Thus for example concerning drinks with cold milk (ice coffee), it is always the coffee, which is firstly dispensed, so that it can cool in the cup. Likewise, concerning drinks with milk froth, the milk froth is always dispensed after the coffee for aesthetic reasons. For adaptable preparation parameters, the preparation prescript includes a standard value or default value which is used when the user does not adapt the parameter. The entirely of the adaptable preparation parameters is hereinafter also called "recipe".

Non-adaptable preparation parameters, for example, can be brewing parameters such as water temperature, a brewing time or a pressure. These brewing parameters can be optimised to the respective contents of the portion package by the manufacturer of the portion packages. In this case then, concerning the non-adaptable preparation parameters it is a case of first preparation parameters of the preparation prescript, which are assigned to the portion code 33 and are stored in the drinks preparation machine 1.

On preparing a coffee-based drink, adaptable preparation parameters are for example the quantity of coffee (in particular above the brewing quantity which is defined above), the quantity of milk and/or milk froth, a milk temperature and/or here too the receptacle size or total quantity as well as the sequence of creation and delivery into the receptacle 2. The milk temperature can either be specified only as "warm" or "cold", or graded more finely, for example by way of a temperature detail.

A selection of one or more such preparation parameters is displayed to the user on the operating unit 14 of the drinks preparation machine 1 or on the user interface 44 of the operating appliance 4, and an input of the use for adapting the preparation parameter is detected, for adapting adaptable preparations parameters. The input can be effected by way of actuating real buttons and/or virtual buttons such as keys or "buttons" in particular "arrow keys" and/or displaceable markings or "sliders" on a touchscreen of the operating unit 14 or of the operating appliance 4.

Basically, all types of parameters can be adapted in this manner. The adaption of shares of part-products of a total product is described hereinafter. According to the representation, which is shown in FIG. 1, the input is effected by way of displacing markings, hereinafter called adjustment symbols 45, 46, 47, on a screen, in particular on a touchscreen of the operating appliance 4 or of the operating unit 14. Herein, the adjustment symbols 45, 46, 47 are represented on a symbolic representation of the total product with the part-products. Thereby, a receptacle 2 can be represented in cross section (as in FIG. 1) or the complete width of the screen can be filled out by a representation of the part-products (see FIG. 3).

This representation can be scaled such that the total quantity is always represented with the same size in the representation irrespective of the total quantity of the total product which is to be produced (ideally corresponding to the size or the volume of a selected receptacle 2). In this case, the representation only provides information on the relative shares of the part-products with regard to the total product.

This representation can alternatively be scaled such that the represented total quantity is represented proportionally to the total quantity of the total product that is to be produced. In this case, the representation provides information on the absolute quantity of the part-products and of the total product.

A mutual position of the adjustment symbols along a linear axis represents the share or the quantity or a filling level of part-products of the total product. A vertical layering of the part-products in the receptacle 2 is displayed in the shown example. Herein, a first share display 41 represents the share of a first part-product and this share can be adapted by the user on the touchscreen by way of displacing a first adjustment symbol 45. The first part-product for example is coffee. Analogously, a second share display 42 with a second adjustment symbol 46 and a third share display 43 with a third adjustment symbol 47 represent milk and milk froth as further part-products. The adjustment symbols can be adapted by buttons or other input elements in the case that no touchscreen is present.

Further elements for adapting preparation parameters are a receptacle selection symbol 48 and a temperature selection symbol 49. Given an activated receptacle selection symbol 48, for example after touching the receptacle selection symbol 48, a selection of receptacles with different volumes is displayed and a selection of the user is detectable. In an analogous manner, the selection of a temperature of one of the part-products, here milk, is detectable given an activated temperature selection symbol 49.

The operating appliance 4 transmits information that represents the detected user inputs such as quantity shares, selection of the receptacle or total quantity, temperature selection, preparation sequence, etc. to the drinks preparation machine 1 in a direct manner via the third communication connection 53 or indirectly via the second communication connection 52 and the first communication connection 51.

Individual or all parameters of preparation prescripts can each be assigned to a portion category 31 and/or to a portion identity 32. These parameters or a set of such parameters here are also called "first preparation parameters". An assignment can be effected by an entry in an assignment table—or a realisation that is equivalent with regard to computer technology—in which portion categories 31 and portion identities 32 are stored, and first preparation parameters are assigned to each stored portion category 31 and/or portion identity 32.

The first preparation parameters and the assignment table are stored in the drinks preparation machine 1 or its superordinate control unit 13. For this, the superordinate control unit 13 can be configured to load further first preparation parameters or assignments by way of the communication unit 15 via one of the communication connections 51, 53 or from a removable, portable data carrier and to accordingly supplement or modify and thus update those which are stored. Herein, one can envisage certain preparation parameters basically not being modifiable, and therefore not capable of being manipulated. One can prevent, for example, a temperature setpoint of a heater being set to a damagingly high value herewith.

The portion category 31 and the portion identity 32 of an inserted portion packaging 3 are read, in order to control the preparation of a product or of a total product. In the case that the assignment table includes first preparation parameters, which are assigned to the portion identity 32, then it is these that are used. If not, then the first preparation parameters assigned to the portion category 31 are used. Herewith, on introducing new products with new portion identities 32 which with regard to an older drinks preparation machine 1 are not yet known or have not yet been updated, despite this one still succeeds in a meaningful, albeit not optimally adapted preparation being able to take place on the basis of the portion category 31. For example, one can ensure that the portion category 31 of the portion packages 3 is always one of "coffee"; "espresso" and "special capsule" and corresponding first preparation parameters and thus a useable preparation prescript for each of these three categories are always stored in each drinks preparation machine 1.

In other words, a stored brewing profile (as a set of first preparation parameters) is present for each envisaged portion category 31, the brewing profile being used when, given an inserted portion package 3, only the portion category 31 and not the portion identity 32 includes an assigned brewing profile, which is stored in the drinks preparation machine 1.

Alternatively, at all events the preparation can be effected on the basis of the portion category 31, and the portion identity 32 is only used in order to display additional information on the portion identity 32, thus a certain product variety, at the operating unit 14 and/or at the operating appliance 4. Such additional information relates for example to the product name, preparation recommendations, origin and taste of the product variety.

The additional information and its assignment to portion identities 32, for example, by way of a further assignment table are stored in the drinks preparation machine 1 or its superordinate control unit 13. The superordinate control unit 13 can be configured to load further additional information and assignments by way of the communication unit 15 via one of the communication connections 51, 53 or from a removable portable data carrier and to accordingly supplement or modify and thus update that which is stored.

If a portion identity 32 is not known in the drinks preparation machine 1, then a display corresponding to the portion category 31 can be displayed at the operating unit 14 or the operating appliance 4, for example "coffee capsule" or "espresso capsule" and the user is requested to update the drinks preparation machine 1.

On updating, complete preparation prescripts, first preparation parameters, additional information and their assignments to portion identities 32, collectively called update information, are loaded into the drinks preparation machine 1. This can be effected by way of the user creating a connection between the drinks preparation machine 1 and the communication network 5. This in turn can be effected by way of the first communication connection 51 being created, for example by way of setting up a Wi-Fi or WLAN connection to the drinks preparation machine 1. The communication unit 15 can then download the update information from a server of the manufacturer. Alternatively, the update information can be downloaded from the communication network 5 by the operating appliance 4 via a mobile data connection corresponding to the second communication connection 52 and in a second step be transmitted via the third communication connection 53 to the drinks preparation machine 1. This has the advantage that no direct connection of the communication unit 15 to the internet is present and thus there is no vulnerability to hackers.

An exemplary sequence of the preparation of a drink is the following:

1. The user inserts a portion package 3 into the drinks preparation machine 1, where the portion code 33 is readable by the capsule recognition unit 132.
2. The capsule recognition is carried out.
3. After the capsule recognition unit 132 has decoded the portion code 33, it sends the decoded portion category 31 (brewing profile code) and the portion identity 32 (article number) to the control unit 12.
4. The user selects a recipe on the operating appliance 4 or configures a new recipe For configuring a new recipe, for example according a menu command "create new recipe" activated at the operating appliance 4, a representation according to FIG. 2 for the selection of a recipe to be modified is optionally displayed, and then according to FIG. 3 the adjustment symbols 45, 46, 47 and further symbols 48, 49 for the modification of the recipe. The modified recipe is transmitted from the operating appliance 4 to the control unit 12. The recipe is adopted by a recipe data bank. Herein, one can envisage the recipe only being adopted and permanently stored in the drinks preparation machine 1 if the user confirms the adoption by an input at the operating unit 14. In the case for example of a publically operated drinks preparation machine 1, one can also envisage preparation prescripts only being permanently storable by a user with corresponding change privileges. A user without such privileges can possibly modify a preparation prescript and execute it in modified form, but not store it on the drinks preparation machine 1, but optionally only on his own operating appliance 4.
5. The user via the operating unit 14 selects the recipe to be prepared from the recipe data bank or confirms the selection of a recipe which is selected at the operating appliance 4 or which is newly configured.
6. The operating unit 14 or the operating appliance 4 transmits a command for preparing the selected recipe to the control unit 12.
7. The control unit 12 receives the command for preparing the selected recipe.
8. The control unit 12 examines whether it has received a valid portion category 31 and a portion identity 32, from the capsule recognition unit 132.
9. The control unit 12, on the basis of the portion identity 32 or only of the portion category 31, seeks the assigned first preparation parameters (for example in the form of a brewing profile in the case of a coffee machine) and adapts adaptable preparation parameters in accordance with the recipe selection of the user. If the portion identity 32 and the recipe selection are compatible, then a corresponding indication can be displayed. Optionally, a recommendation can be displayed should the portion identity 32 and the recipe selection not be compatible. In the case of a coffee machine, the brewing profile for the brewing and possibly also parameters for the preparation of milk or milk froth results herewith.
10. The control unit 12 controls the preparation on the basis of the preparation parameters.

The above steps can also be carried out in another sequence. For example, the steps for selection of a recipe can be carried out before the insertion of the portion package 3. Herein, a recommendation concerning the choice of a product variety or portion identity 32 which are suitable for the recipe can be displayed at the operating appliance 4 or at the operating unit 14 (FIG. 4) after the selection of the recipe.

FIG. 5 schematically shows the data that is used on determining the preparation parameters: First preparation parameters of preparation prescripts, which are selected in accordance with a portion identity 32 or a portion category 31, are stored in the assignment table 61 and are transferred as a portion-specific part 65 into a preparation prescript 64 which is to be implemented. A user-specific part 66 of the preparation prescript 64, which is to be implemented, with adaptable preparation parameters, is selected by the user via an interface unit of the operating unit 14 or operating appliance 4 as a recipe 62. Herein, the user can manage and modify recipes, i.e. retrieve a recipe 62 from a quantity of stored recipes, modify it, copy it, store it and select it for preparation. This managing and modifying of the recipes can be effected whilst storing the recipes in the drinks preparation machine 1 itself or in an external operating appliance 4.

Standard values according to the assignment table 61 can be present for the user-specific part 66 in the case that the user does not select a recipe 62.

The invention claimed is:

1. A method for the operation of a drinks preparation machine, for producing a total product amid the use of a portion package, and according to a preparation prescript, comprising the steps of:
   detecting a portion code of the portion package by way of a portion recognition unit;
   determining first preparation parameters of the preparation prescript, which are assigned to the portion code, and determining second preparation parameters of the preparation prescript, wherein at least one of the first and the second preparation parameters includes at least one adaptable preparation parameter, and at least one of the first and the second preparation parameters are not adaptable;
   detecting a user input of a user, and adapting the at least one adaptable preparation parameter according to the user input to generate at least one adapted preparation parameter;
   preparing the total product according to the preparation prescript including the at least one adapted preparation parameter.

2. The method according to claim 1, wherein the first preparation parameters are not adaptable.

3. The method according to claim 1, wherein:
   an interface displays the at least one adaptable preparation parameter to the user, and
   the interface detects the user input of the user.

4. The method according to claim 1, further comprising:
   storing the at least one adapted preparation parameter in the drinks preparation machine as a recipe;
   retrieving the recipe at a later point in time;
   detecting a further user input; and
   adapting the recipe according to the further user input.

5. The method according to claim 1, wherein the at least one adaptable preparation parameter defines a quantity of the total product or a quantity of one of several part-products, from which the total product is composed.

6. The method according to claim 5, wherein:
   the drinks preparation machine is a coffee machine which is designed for preparing the total product including a first share of coffee as a first part-product and including a second share of milk as a second part-product, and
   the at least one adaptable preparation parameter includes a first adaptable preparation parameter defining a first quantity share of the first share of coffee, and includes a second adaptable preparation parameter defining a second quantity share of the second share of milk.

7. The method according to claim 6, wherein the at least one adaptable preparation parameter includes a further adaptable preparation parameter defining at least one of:
   a milk temperature;
   a receptacle size or a total volume of the total product;
   a quantity of milk froth;
   a quantity ratio of milk and milk froth;
   a temporal sequence, in which the part-products are to be created.

8. The method according to claim 1, wherein the portion code includes a portion identity of the portion package, and wherein the first preparation parameters and/or additional information are assigned to the portion identity, the method further comprising:
   determining, on basis of the portion identity, whether or not the first preparation parameters and/or the additional information are stored in the drinks preparation machine;
   if the first preparation parameters and/or the additional information are stored in the drinks preparation machine, retrieving the first preparation parameters and/or the additional information;
   if the first preparation parameters and/or the additional information are not stored in the drinks preparation machine, representing a display to the user with a request to carry out or to permit a downloading of the first preparation parameters and/or the additional information.

9. The method according to claim 1, wherein
   the portion code defines a portion category of the portion package and a portion identity of the portion package,
   the first preparation parameters are assigned to both the portion category and to the portion identity,
   the first preparation parameters assigned to the portion category are stored in the drinks preparation machine, and
   the step of determining the first preparation parameters includes:
     determining, on a basis of the portion identity, whether or not the first preparation parameters assigned to the portion identity are stored in the drinks preparation machine;
     if the first preparation parameters assigned to the portion identity are stored in the drinks preparation machine, determining, on a basis of the portion identity, the first preparation parameters assigned to the portion identity;
     if the first preparation parameters assigned to the portion identity are not stored in the drinks preparation machine, determining, on a basis of the portion category, the first preparation parameters assigned to the portion category.

10. The method according to claim 1, wherein:
    the portion code defines a portion category of the portion package, and the first preparation parameters are assigned to the portion category,
    the step of determining the first preparation parameters includes:
      determining, on basis of the portion category, the first preparation parameters assigned to the portion category.

11. The method according to claim 1, wherein:
    the portion code defines a portion category of the portion package and a portion identity of the portion package,
    the portion category is characterized in the drinks preparation machine as a special category or is not characterized as a special category, and
    the first preparation parameters are assigned to the portion identity,
    the step of determining the first preparation parameters include:
      determining, on the basis of the portion category, whether or not the portion category is characterized as the special category;

if the portion category is characterized as the special category, determining, on the basis of the portion identity, the first preparation parameters assigned to the portion identity.

\* \* \* \* \*